United States Patent
Richards

[15] 3,697,122
[45] Oct. 10, 1972

[54] CAMPING TRAILERS
[72] Inventor: Dennis H. Richards, 62 Church Green Road, Bletchley, England
[22] Filed: July 29, 1970
[21] Appl. No.: 59,266

[30] Foreign Application Priority Data
Aug. 1, 1969  Great Britain..........38,626/69

[52] U.S. Cl.................................296/23 R, 296/27
[51] Int. Cl................................................B60p 3/34
[58] Field of Search..............................296/27, 23 C

[56] References Cited
UNITED STATES PATENTS 2,893,780  7/1959  Ervine.....................296/23.3
2,457,397  12/1948  Richards................280/106 T

*Primary Examiner*—Philip Goodman
*Attorney*—Kenyon & Kenyon Reilly Carr & Chapin

[57] ABSTRACT

The invention relates to a trailer for towing behind a vehicle which trailer is designed specifically for camping and is convertible from a compact towing state into a large size unit for supporting a tent and it comprises a main chassis in a longitudinal direction so as to provide a substantially continuous floor surface having an area substantially twice that of the floor area of the trailer in its unextended position. Once the trailer has been moved to its extended position, a frame tent is erectible around the trailer and is supported on it, together with seat/bunks and a kitchen unit.

12 Claims, 3 Drawing Figures

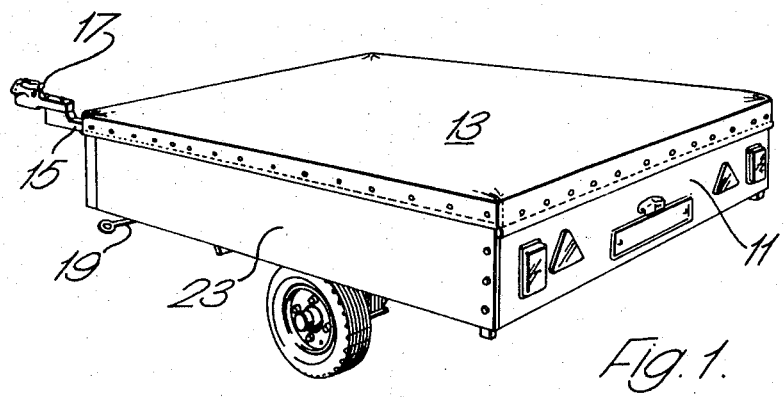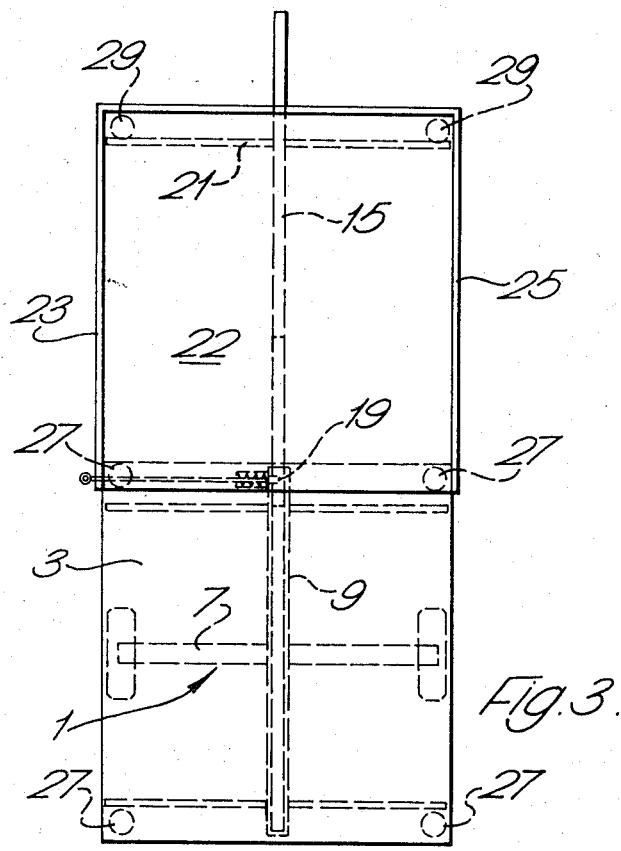

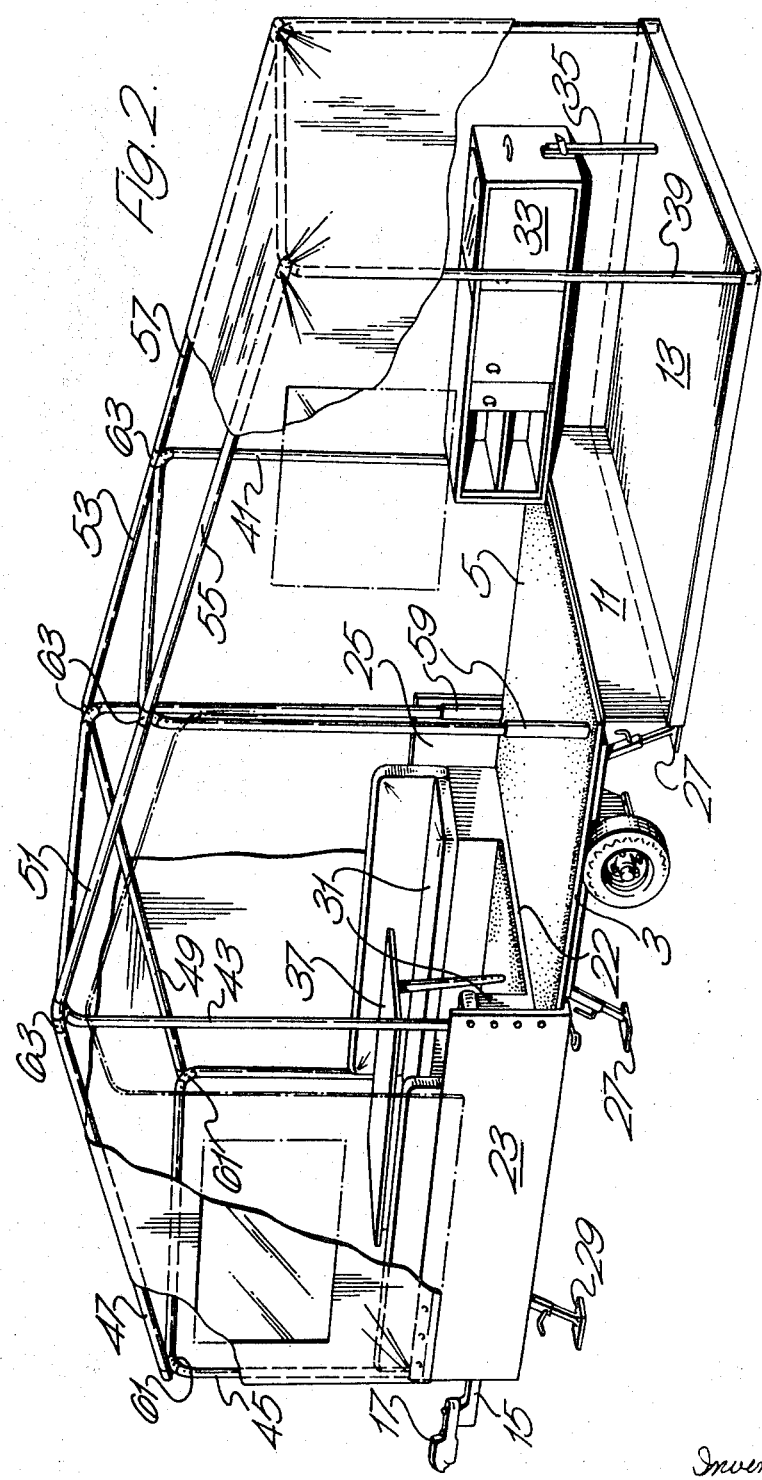

CAMPING TRAILERS

This invention relates to a trailer, for towing behind a motor vehicle, which trailer is reversibly convertible from a compact "towing" state to an enlarged "static" state providing an enlarged floor area for a tent erected around the trailer. The trailer is designed primarily as a camping trailer.

According to the present invention, a trailer comprises a main chassis to which a main floor is secured, a pair of ground engaging wheels mounted on the main chassis, and a sub-chassis having a secondary floor associated with it, the sub-chassis together with its floor being slidable relative to the main chassis and its floor between a first closed up position and a second extended position, to provide a substantially continuous floor surface having an area twice that of the main chassis floor.

Preferably, the trailer is provided with three upstanding walls which are secured to the sub-chassis or the secondary floor and a fourth wall which is secured to the main chassis or the main floor. Preferably, also, the trailer is extendible in a direction parallel to its longitudinal axis to enable a towing vehicle to effect the necessary extension. A cover for the trailer may be secured to the fourth side wall of the trailer which wall may be pivoted as a tail board, to the main chassis or floor, so that when the tail board is let down, the under surface of the cover provides an additional floor. Normally however, the cover is a flexible water proof sheet releasably secured to the tail board, which cover could be used as a ground sheet.

In the preferred arrangement, the sub-chassis floor is arranged at substantially the same level, but just above the main chassis floor and two seat/bunks are secured to the sub-chassis floor and a cooker unit and/or sink unit is/are secured to the main chassis floor. The cooker and/or sink unit, i.e. kitchen unit may be pivotally mounted about a vertical axis for swinging movement between a stowed position and a position for use.

In a particular preferred embodiment of this invention the trailer has a main chassis substantially in the form of a right angle cross, and the transverse member of the cross provides a suitable mounting member for a pair of road wheels. The road wheels may be mounted in any known manner on the transverse member, e.g. on the outer ends of out-rigger arms, the opposite end of each of which is pivotally mounted to a depending member secured to the transverse member of the main chassis. Intermediate the two ends of each out-rigger arm, each arm is embraced by a rubber shock absorber carried by a second arm depending from the outer extremity of the transverse chassis member. Alternatively, a solid rubber torsion type suspension may be used.

The longitudinal chassis member of the cross runs centrally of the trailer and is preferably of hollow box section. It will be appreciated, however, that two or more longitudinal chassis members may be provided, each of which may be of any hollow or channel section. Additional transverse chassis members may be provided at the front and rear extremities of the longitudinal chassis member. Preferably, the underside of the floor of the sub-chassis rests on the floor surface of the main chassis this floor surface providing a smooth bearing surface during extension and retraction of the sub-chassis relative to the main chassis.

A preferred embodiment of camping trailer according to the present invention is now described with reference to the accompanying drawings, in which:

FIG. 1 is a perspective view of the trailer unextended.

FIG. 2 is a perspective view of the trailer extended, and

FIG. 3 is a schematic plan view illustrating the chassis arrangement.

Referring to the drawings, the camping trailer has a main chassis 1 to which is bolted a main floor 3. The floor is covered with a nylon pile carpet 5. As can be seen from FIG. 3, the main chassis has a transverse member 7 and a longitudinal member 9 of hollow box section, forming a right-angle cross, and addition fore and aft transverse members. Additional longitudinal members could also be provided.

A tail board 11 for the trailer is pivotally connected to the rear edge of the floor, and a sheet like cover 13 for the trailer is releasably secured to the top edge of the tail board 11 so that when the tail board is moved from a "closed" to an "open" position in which it hangs down, the cover may be used as a ground sheet. It is envisaged that the cover could be a solid board hinged to the tail board. Preferably the height of the tail board 11 is somewhat less than the distance of the floor 3 above the ground.

Slidably mounted within the longitudinal member 9 (or members) of the main chassis is a longitudinal member 15 forming part of the trailer's sub-chassis. The longitudinal member 15 is slightly longer than the member 9, and at its forward end is provided with a suitable trailer coupling device 17. An aperture is provided in the forward end of the longitudinal main chassis member 9 and two apertures are also provided in the longitudinal sub-chassis member 15, one at each end thereof. When the sub-chassis is fully extended with respect to the main chassis, the aperture in the rear of the longitudinal sub-chassis member 15 is in alignment with the aperture in the main chassis member 9, and when the sub-chassis is in its closed up transport or towing position, the other aperture in the sub-chassis member 15 is in alignment with that in the main chassis member 9. A safety locking pin 19 consisting of a spring loaded plunger or pin attached to the main chassis member is used to lock the two longitudinal chassis members in their two extreme positions, i.e. an extended position and a closed transport position. A forward transverse sub-chassis member 21 is secured to the longitudinal sub-chassis member. To ensure that the main and sub-chassis cannot become separate during extension, a tie rod is arranged between them.

A floor 22 which has a smaller area than the main chassis floor, is secured to the sub-chassis, together with a pair of upstanding side walls 23, 25 and a front wall and the floor 22 is spaced from the lower edge of the side and front walls of the trailer by a distance substantially equal to the thickness of the floor 3 and carpet 5 of the main chassis. The two trailer side walls 23, 25 and a front wall are provided with suitable, inwardly facing locating channels along the lower portions of their inner faces for the side and front edges of the main chassis floor, but the sub-chassis and its floor are supported on the carpet 5 of the main chassis. It will thus be appreciated that the sub-chassis can be slidden between a closed-up position for towing shown in FIG. 1 and an extended static position, relative to the main chassis, and during this movement, the floor 21 of the sub-chassis moves from above the floor 3 of the main chassis to a position forwardly of the floor of the main chassis but still slightly above it. The effect of this is nearly to double the floor space when the sub-chassis is in an extended position. A carpet is also provided on the floor 21.

Prior to extending the sub-chassis relative to the main chassis, four drop legs 27 secured respectively to the main chassis at each of its corners are pivoted into ground engaging positions to steady the trailer and prevent it rocking about its axle, and once extended, a pair of further drop legs 29 at the two front corners of the sub-chassis are moved into ground engaging position. Each drop leg comprises a sleeve pivotally connected to a chassis member and a rod slidable in the sleeve and having a foot at one end, together with a conventional cranked clamping handle. The rod is considerably longer than the sleeve, and when in an inoperative position, extends outwardly beyond the pivoted end of the sleeve, and rests against its respective chassis member, hence preventing the drop leg from moving to a ground engaging position until it is extended relative to the sleeve.

Two seat/bunks 31 are secured to the floor of the sub-chassis and move with it when it is extended, and a sink unit and/or cooker unit i.e. a kitchen unit is/are secured to the floor of the main chassis. As shown, a single sink unit 33 with storage space and room for a cooker is secured to the floor 3 by means of a pivot pin (not shown) at a rear corner of the main chassis floor so that the unit can be swung rearwardly and outwardly through 90° to overlie the additional rear floor space and once the unit is in this position, one or more suitable support legs 35 may be moved into a suitable support position. A collapsible table 37 is provided between the bunks 31, and during travelling foam cushions for the bunks are stowed beneath the table.

Once the trailer has been extended a tent is erected around the floor space. The tent is a canvas or plastics material frame tent, the frame comprising a plurality of inverted U-shaped hoops 39, 41, 43, 45 and cross rods 47, 49, 51, 53, 55 and 57. The hoops 41, 43 and 45 are supported by suitable channel section mounting points 59 on the trailer and the hoop 39 rests on the ground. The cross rods 47 and 49 are pivotally connected to the corners of the hoop 45 by suitable sleeve-like members 61, and the cross rods 55, 57 are likewise connected to the hoop 39. The free ends of each of the rods 47, 49, 55, 57 each terminates in a male connecting member arranged respectively to pass through sleeve-like coupling elements 63 pivotally mounted on the corners of the hoops 41 and 43 and then to engage in female connecting members carried by the free ends of the rods 51 and 53. It will be appreciated that the male connecting members on the rods 47 and 49 will be cranked and that the male and female members could be interchanged. The erected frame is clearly shown in FIG. 2. The advantage of the hoops and cross rods arrangement is that the frame can easily be dismantled and stored on the top of the trailer when in its non-extended state. The tent is of standard construction to fit over the frame, although it could be of different construction. It is envisaged that the walls could be made of prefabricated rigid sheet material. Furthermore, the trailer could be used for purposes other than camping, although it would normally be used for camping.

What is claimed is:

1. A trailer for camping comprising a main chassis, a main floor secured to the main chassis, a pair of ground engaging wheels, means mounting said wheels on said main chassis, a sub-chassis, a secondary floor associated with said sub-chassis, means mounting the sub-chassis together with its secondary floor for sliding movement relative to said main chassis and its main floor between a first closed up position and a second extended position, said trailer, when in its second extended position providing a substantially continuous floor surface having an area twice that of the main chassis floor, the underside of the floor of the sub-chassis, when in its first, closed-up position, rests on the floor surface of said main chassis, said floor surface providing a smooth bearing surface during sliding of said sub-chassis together with its floor relative to said main chassis, said floor surface comprising a nylon carpet.

2. A trailer as claimed in claim 1, including a tent supporting frame comprising a plurality of open ended substantially rectangular hoops, the free ends of at least three of which are arranged to engage in locating members provided on the main and sub-chassis, and a plurality of cross rods each pivotally connected to the corners of the respective hoops at one end and the other end thereof being arranged to engage with a sleeve pivotally mounted on the corner of another hoop or with the end of another cross rod.

3. A trailer for camping comprising a main chassis, a main floor secured to the main chassis, a pair of ground engaging wheels, means mounting said wheels on said main chassis, a sub-chassis, a secondary floor associated with said sub-chassis, means mounting the sub-chassis together with its secondary floor for sliding movement relative to said main chassis and its main floor between a first closed up position and a second extended position, said trailer, when in its second extended position providing a substantially continuous floor surface having an area twice that of the main chassis floor, and three upstanding walls secured to said sub-chassis floor and including a fourth wall which is pivotally secured to the main chassis floor.

4. A trailer for camping comprising a main chassis, a main floor secured to the main chassis, a pair of ground engaging wheels, means mounting said wheels on said main chassis, a sub-chassis, a secondary floor associated with said sub-chassis, means mounting the sub-chassis together with its secondary floor for sliding movement relative to said main chassis and its main floor between a first closed up position and a second extended position, said trailer, when in its second extended position providing a substantially continuous floor surface having an area twice that of the main chassis floor, three upstanding walls secured to said sub-chassis floor and including a fourth wall which is pivotally secured to the main chassis floor, and a cover for the trailer secured at least to said fourth side wall of the trailer which may be pivoted as a tail board so that when the tail board is left down the cover may be used as an extra floor space to the rear of the main chassis.

5. A trailer for camping comprising a main chassis, a main floor secured to the main chassis, a pair of ground engaging wheels, means mounting said wheels on said main chassis, a sub-chassis, a secondary floor associated with said sub-chassis, means mounting the sub-chassis together with its secondary floor for sliding movement relative to said main chassis and its main floor between a first closed up position and a second extended position, said trailer, when in its second extended position providing a substantially continuous floor surface having an area twice that of the main chassis floor, and a pair of seat bunks secured to the sub-chassis floor and a kitchen unit pivotally secured to the main chassis floor for swinging movement about a vertical axis.

6. A trailer for camping comprising a main chassis, a main floor secured to the main chassis, a pair of ground engaging wheels, means mounting said wheels on said main chassis, a sub-chassis, a secondary floor associated with said sub-chassis, means mounting the sub-chassis together with its secondary floor for sliding movement relative to said main chassis and its main floor between a first closed up position and a second extended position, said trailer, when in its second extended position providing a substantially continuous floor surface having an area twice that of the main chassis floor, said main chassis is substantially in the form of a right angled cross, the transverse member of the cross providing a suitable mounting member for the road wheels, said longitudinal chassis member of the cross running centrally of the trailer and being of hollow box section and said sub-chassis including a further longitudinal member slidably mounted in the hollow box section member, and a towing hitch secured to said further longitudinal member.

7. A trailer for camping comprising a main chassis, a main floor secured to the main chassis, a pair of ground engaging wheels, means mounting said wheels on said main chassis, a sub-chassis, a secondary floor associated with said sub-chassis, means mounting the sub-chassis together with its secondary floor for sliding movement relative to said main chassis and its main floor between a first closed up position and a second extended position, said trailer, when in its second extended position providing a substantially continuous floor surface having an area twice that of the main chassis floor, said main chassis is substantially in the form of a right angled cross, the transverse member of the cross providing a suitable mounting member for the road wheels, said longitudinal chassis member of the cross running centrally of the trailer and being of hollow box section and said sub-chassis including a further longitudinal member slidably mounted in the hollow box section member, a towing hitch secured to said further longitudinal member, and locking means between said main and sub-chassis for securing the trailer in its closed up position and its extended position.

8. A trailer for camping comprising a main chassis, a main floor secured to the main chassis, a pair of ground engaging wheels, means mounting said wheels on said main chassis, a sub-chassis, a secondary floor associated with said sub-chassis, means mounting the sub-chassis together with its secondary floor for sliding movement relative to said main chassis and its main floor between a first closed up position and a second extended position, said trailer, when in its second extended position providing a substantially continuous floor surface having an area twice that of the main chassis floor, and a plurality of drop legs arranged at the corners of said chassis, each of said drop legs comprising a sleeve pivotally connected to a chassis member, a rod slidable within the sleeve between a first folded position in which an end thereof extends beyond the pivot point of the sleeve and bears against the chassis member to prevent the sleeve pivoting out of a substantially horizontal position, and a second extended position in which a foot on the other end of the rod engages the ground, and a locking member for preventing movement between the sleeve and rod.

9. A trailer for camping comprising a main chassis, a main floor secured to the main chassis, a pair of ground engaging wheels, means mounting said wheels on said main chassis, a sub-chassis, a secondary floor associated with said sub-chassis, means mounting the sub-chassis together with its secondary floor for sliding movement relative to said main chassis and its main floor between a first closed up position and a second extended position, said trailer, when in its second extended position providing a substantially continuous floor surface having an area twice that of the main chassis floor, and a frame comprising a plurality of U-shaped hoops, the free ends of at least three of which are arranged to engage in locating members provided on the main and sub-chassis, and a plurality of cross rods, some of which are pivotally connected to the corners of respective hoops at one end and the other ends of which are arranged to engage with sleeves pivotally mounted on the corners of another hoop and with the ends of further cross rods arranged to extend between the said sleeves, and a tent which can be supported by the erected frame.

10. A trailer for camping comprising a main chassis, a main floor secured to said main chassis, a pair of ground engaging wheels, means mounting said wheels on the main chassis, a sub-chassis supported by said main chassis, a towing device connected to said sub-chassis and a secondary floor supported on it, means mounting the sub-chassis together with its secondary floor for sliding movement relative to the main chassis and its main floor in a direction parallel to the travelling direction of the trailer to enable a towing vehicle to effect the necessary extension and retraction between a first closed up position and a second extended position, the trailer, when in its second, extended position providing a floor surface having an area almost twice that of the main chassis floor, the underside of the floor of the sub-chassis, when in said first, closed-up position, resting on the floor surface of the main chassis, the latter floor surface providing a smooth bearing surface during sliding of the sub-chassis together with its floor relative to the main chassis to said second position.

11. A trailer for camping comprising a main chassis, a main floor secured to said main chassis, a pair of ground engaging wheels, means mounting said wheels on the main chassis, a sub-chassis supported by said main chassis, a towing device connected to said sub-chassis and a secondary floor supported on it, means mounting the sub-chassis together with its secondary floor for sliding movement relative to the main chassis and its main floor in a direction parallel to the travelling direction of the trailer to enable a towing vehicle to effect the necessary extension and retraction between a first closed up position and a second extended position, the trailer, when in its second, extended position providing a floor surface having an area almost twice that of the main chassis floor, the underside of the floor of the sub-chassis, when in said first, closed-up position, resting on the floor surface of the main chassis, the latter floor surface providing a smooth bearing surface during sliding of the sub-chassis together with its floor relative to the main chassis to said second position, said main chassis including members disposed substantially in the form of a right angled cross, the transverse member of the cross providing a suitable mounting member for said wheels, and the longitudinal chassis member of the cross running centrally of the trailer and being of hollow box section and in which said sub-chassis includes a further longitudinal member slidably mounted in the hollow box section member.

12. A trailer for camping comprising a main chassis, a substantially rectangular main floor secured to said main chassis, a pair of ground engaging wheels, means mounting said wheels on the main chassis, a sub-chassis supported by said main chassis, a towing device connected to said sub-chassis and a secondary floor supported on it, means mounting the sub-chassis together with its secondary floor for sliding movement relative to the main chassis and its main floor in a direction parallel to the travelling direction of the trailer to enable a towing vehicle to effect the necessary extension and retraction between a first closed-up position and a second extended position, the trailer, when in its second, extended position providing a floor surface having an area almost twice that of the main chassis floor, the underside of the floor of the sub-chassis, when in said first, closed-up position, resting on the floor surface of the main chassis, the latter floor surface providing a smooth bearing surface during sliding of the sub-chassis together with its floor relative to the main chassis to said second position, a plurality of drop legs arranged respectively adjacent the four corners of the main floor and at the front corners of the secondary floor, each of said drop legs comprising a sleeve pivotally connected to a chassis member or floor, a rod slidable within the sleeve between a first folded position in which an end thereof extends beyond the pivot point of the sleeve and bears against the chassis member or floor to prevent the sleeve pivoting out of a substantially horizontal position, and a second extended position in which a foot on the other end of the rod engages the ground, and a locking member for preventing movement between the sleeve and rod.

* * * * *